United States Patent

Dyni

[15] 3,642,433

[45] Feb. 15, 1972

[54] PROCESS FOR EXTRACTING ALUMINUM COMPOUNDS FROM DAWSONITE AND DAWSONITIC OIL SHALE

[72] Inventor: John R. Dyni, Denver, Colo.

[73] Assignee: The United States of America as represented by the Secretary of the Interior

[22] Filed: Aug. 5, 1968

[21] Appl. No.: 749,968

[52] U.S. Cl. ..................................23/52, 23/143, 208/11
[51] Int. Cl. ..................................................C01f 7/02
[58] Field of Search ..............................23/50, 52, 143, 315

[56] References Cited

UNITED STATES PATENTS

| | | | |
|---|---|---|---|
| 3,389,975 | 6/1968 | Van Nordstrand | 23/315 |
| 1,891,609 | 12/1932 | Scheidt | 23/52 |
| 2,141,132 | 12/1938 | Folger | 23/143 |
| 2,973,244 | 2/1961 | Spence | 23/52 |
| 3,459,502 | 8/1969 | Van Nordstrand | 23/52 X |
| 3,516,787 | 6/1970 | Van Nordstrand | 23/52 X |

*Primary Examiner*—Herbert T. Carter
*Attorney*—Ernest S. Cohen and M. Howard Silverstein

[57] ABSTRACT

Dawsonite and dawsonitic oil shales are heated to decompose the dawsonite into sodium aluminate. Water is then employed to dissolve and form an aluminate solution from which alumina can be recovered by known methods.

10 Claims, No Drawings

PROCESS FOR EXTRACTING ALUMINUM COMPOUNDS FROM DAWSONITE AND DAWSONITIC OIL SHALE

This invention, which relates to the recovery of aluminum values from dawsonite and dawsonitic oil shales, resulted from work done by U.S. Geological Survey in the U.S. Department of the Interior, and domestic title to the invention is in the Government.

It has been recently learned that the large deposits of oil shale deposits in this country, particularly those in Colorado, contain besides kerogen, substantial amounts of aluminum in the form of dawsonite [$NaAl(OH)_2CO_3$].

While determining the economic potential of dawsonitic oil shale as a source of alumina or aluminum, I discovered that, after heating the shale to above about 380° C., the aluminum can be extracted with a simple water leach. Thereafter the aluminum-bearing solution can be treated in known manners (carbonation to precipitate aluminum hydroxide, calcination to produce alumina, etc.) to recover aluminum in the desired form.

It is therefore an object of the present invention to recover aluminum from a new source material. A further object is to extract aluminum with a relatively inexpensive leaching medium. Other objects and advantages will be obvious from the following more detailed description of the invention.

In the practice of the invention, optimum operating conditions vary somewhat depending upon whether or not the dawsonite is combined with oil shale. That is, when dawsonite per se is heated to about 380° C., it decomposes endothermically losing its carbon dioxide and hydroxyl water, and forms residual amorphous aluminate compounds which are partially soluble in water. Up to about 525° C., the decomposition product is still in the amorphous, partially water-soluble state. With slightly more heating up to about 560° C., poorly crystalline sodium aluminate forms which is soluble in cool and hot water. Additional heating up to 1,000° C., improves the crystallinity of the sodium aluminate.

The degree of conversion of dawsonite to water-soluble aluminate is also obviously dependent on how long the heated dawsonite is held at elevated temperatures. Optimum heating times for each specific set of conditions should be determined experimentally, as will be apparent to those skilled in the art. In general, if the dawsonite is held several minutes (e.g., 10–30 minutes) at temperatures above 560° C., substantial conversion will occur. Heating times of as much as 20 hours can further increase the degree of conversion.

When the dawsonite is in combination with oil shale, the process of the present invention can be employed with presently known shale-oil-retorting processes. That is, the oil shale is retorted for its shale oil, which retorting simultaneously decomposes the dawsonite to water-soluble form whereby the retort residue or ash is simply leached with water to extract aluminum values. Since dawsonite is so finely disseminated through the oil shale, the retorted rock may require grinding, depending upon specific retorting procedures, to enhance leaching of the aluminum compounds.

During retorting of the oil shale, dawsonite usually cannot be substantially completely heat decomposed to water-soluble aluminate form (as is the case with dawsonite per se) because some side reactions apparently occur between some of the dawsonite and other oil shale constituents. However, at least about half of the dawsonite can generally be converted to a water-soluble product when the shale is heated to temperatures above 400° C. Although some water-soluble aluminate is formed at higher and lower temperatures, the optimum heating range is about 400° C. to about 700° C.

Whatever the source of dawsonite, after conversion of the dawsonite to aluminate, the decomposition product or residue is cooled to a point where evaporation losses of subsequently added water will not be excessive. Thereafter, the cooled residue is leached with water. A water temperature of about 20° C. to about 195° C. (liquid state) is suitable. Leaching time depends upon such factors as the water temperature, the dawsonite sample/water ratio, and the particular solids-liquid contact expedient being employed. Optimum leaching conditions can readily be determined through experimentation, as will be apparent to those skilled in the art. Generally, leaching times can vary from about 5 minutes to several hours while liquid-to-solid ratios during leaching can vary from 1:1 to more than 30:1. The aluminate-bearing leachate can be recirculated through further quantities of heat-decomposed dawsonite or dawsonitic oil shale until the aluminates are sufficiently concentrated in solution.

Subsequently, aluminate-bearing solution is contacted with $CO_2$ gas to precipitate aluminum hydroxide. Calcination is then employed to form alumina.

An alternative to using water as the leaching medium in the present invention, dilute $H_2SO_4$ or dilute HCl or dilute alkaline solution such as NaOH or $Na_2CO_3$ can be employed. In the case of employing dilute NaOH, the amounts of NaOH needed are far less than that required in the well-known Bayer process.

The following example illustrates the effectiveness of the process of the present invention on dawsonitic oil shale.

EXAMPLE A

An approximately 6.6-gm. sample (labeled sample A) of Piceance Creek Basin (Colorado) dawsonitic oil shale was fired to about 720° C., held at this temperature for about 1 hour, cooled to room temperature and leached with 350 ml. of water at about 100° C. for a period of 10 to 15 minutes. Thereafter a small stream of $CO_2$ was bubbled through the solution for about 45 minutes to precipitate out aluminum hydroxide.

A second approximately 6.6-gm. sample (sample B) of Piceance Creek dawsonitic oil shale was treated in the same manner as sample A except that 600 ml. of leaching water at 28° C. was employed. Analyses of the precipitates from both samples were as follows.

| Sample | Weight of unfired sample (grams) | Total aluminum in unfired oil shale sample (wt. %) | Total weight of precipitate (grams) | Aluminum in precipitate (wt. %) |
|---|---|---|---|---|
| A | 6.55 | 6.8 | 0.03 | 41.2 |
| B | 6.59 | 6.3 | 0.34 | 32.0 |

As can be seen from these results as much as 26 percent of the total aluminum in the dawsonite-bearing oil shale can be removed by the process.

The following example shows the relative effectiveness of different leaching mediums on Piceance Creek Basin oil shale.

EXAMPLE B

Three different dawsonite-bearing oil shale samples were each leached at different temperatures with various solvents and the following results were obtained:

SAMPLE C (Total Al content of shale sample = 4.20 weight percent; Al present in shale sample as dawsonite (X-ray analysis) = 3.8 weight percent)

| Retorting Temp. °C. | Extracted Aluminum (wt. % of shale) | | |
|---|---|---|---|
| | Hot distilled water leach | 2% hot NaOH solvent leach | 2% $H_2SO_4$ hot solvent leach |
| 400 | 1.4 | 2.25 | 3.4 |
| 500 | 1.45 | 1.85 | 2.2 |
| 600 | 1.75 | 3.0 | 2.5 |
| 700 | 1.85 | 2.4 | 3.0 |
| 800 | 1.7 | 1.5 | 3.2 |
| 900 | 1.55 | 2.25 | 3.2 |
| 1,000 | 1.5 | 2.4 | 3.0 |

SAMPLE D (Total Al content of shale sample = 4.50 weight percent; Al present in shale sample as dawsonite = 2.9 weight percent)

| Temp. °C. | Extracted Aluminum (wt. % of shale) | | |
|---|---|---|---|
| | Hot distilled water leach | 2% hot NaOH solvent leach | 2% hot $H_2SO_4$ solvent leach |
| 400 | 0.5 | 1.5 | 2.2 |
| 500 | 0.7 | 0.35 | 3.2 |
| 600 | 0.75 | 1.4 | 2.75 |
| 700 | 0.65 | 1.25 | 2.4 |
| 800 | 0.45 | 1.5 | 2.5 |
| 900 | 0.35 | 1.55 | 2.2 |
| 1,000 | 0.5 | 1.8 | 2.0 |

SAMPLE E (Total Al content in shale sample = 6.82 weight percent, Al present in shale sample as dawsonite = 2.5 percent)

| Temp. °C. | Extracted Aluminum (wt. % of shale) | | |
|---|---|---|---|
| | Hot distilled water leach | 2% hot NaOH solvent leach | 2% hot $H_2SO_4$ solvent leach |
| 400 | 0.8 | 3.7 | 4.3 |
| 500 | 0.65 | 3.8 | 4.2 |
| 600 | 0.5 | 3.2 | 3.9 |
| 700 | 0.55 | 3.1 | 4.0 |
| 800 | 0.1 | 3.4 | 3.25 |
| 900 | 0.1 | 2.2 | 2.6 |
| 1,000 | 0.1 | 0.25 | 2.0 |

As can be seen from the above results, dilute NaOH and $H_2SO_4$ not only extract that portion of the dawsonite which has been decomposed to water-soluble aluminate, but also extract some of the aluminum which is originally present in the shale in other forms such as possible amorphous dawsonite, organically associated aluminum, or aluminum hydroxide.

In addition to the substantial aluminum extraction obtained by the process of the present invention, the use of water or dilute acid or base leaches inhibits dissolution of alumino-silicate or silica minerals such as feldspar and quartz which materials could contribute silica, a deleterious substance in alumina recovery processes.

While the process is well adapted to carry out the objects of the present invention, it is to be understood that various modifications and changes may be made all coming within the scope of the following claims.

What is claimed is:

1. A process for recovering aluminum values from dawsonite consisting essentially of
    a. heating said dawsonite to a temperature of about 400° C. to about 1,000° C. for a time sufficient to drive off $CO_2$ and $H_2O$ and convert said dawsonite to a residue containing water-soluble aluminate; and
    b. leaching said residue with water to extract said aluminate.

2. The process of claim 1 wherein said dawsonite is heated in step a to above about 560° C. in order to form crystalline sodium aluminate.

3. A process for recovering aluminum values from dawsonite consisting essentially of
    a. heating said dawsonite to a temperature of about 400° C. to about 1,000° C. for a time sufficient to drive off $CO_2$ and $H_2O$ and convert said dawsonite to a residue containing water-soluble aluminate; and
    b. leaching said residue with dilute $H_2SO_4$ to extract said aluminate.

4. The process of claim 3 wherein said dawsonite is combined with oil shale, whereby said heating step drives off shale oil.

5. The process of claim 4 wherein said dawsonitic shale is heated in step a to a temperature of from about 400° C. to about 700° C.

6. A process for recovering aluminum values from dawsonite consisting essentially of
    a. heating said dawsonite to a temperature of about 400° C. to about 1,000° C. for a time sufficient to drive off $CO_2$ and $H_2O$ and convert said dawsonite to a residue containing water-soluble aluminate; and
    b. leaching said residue with dilute HCl to extract said aluminate.

7. The process of claim 6 wherein said dawsonite is combined with oil shale, whereby said heating step drives off shale oil.

8. The process of claim 7 wherein said dawsonitic oil shale is heated in step a to a temperature of from about 400° C. to about 700° C.

9. A process for recovering aluminum values from dawsonite combined with oil shale consisting essentially of
    a. heating said dawsonite combined with oil shale to a temperature of about 400° C. to about 1,000° C. for a time sufficient to drive off shale oil, $CO_2$ and $H_2O$ and convert said dawsonite to a residue containing water-soluble aluminate; and
    b. leaching said residue with water to extract said aluminate.

10. The process of claim 9 wherein said dawsonitic oil shale is heated in step a to a temperature of from about 400° C. to about 700° C.

* * * * *